Dec. 2, 1958 N. B. SAUNDERS 2,863,135

MAGNETIC MEMORY CIRCUITS

Filed Jan. 29, 1953

INVENTOR.

Norman B. Saunders

BY Robert T. Palmer

Attorney

United States Patent Office 2,863,135

Patented Dec. 2, 1958

2,863,135

MAGNETIC MEMORY CIRCUITS

Norman B. Saunders, Weston, Mass., assignor to American Machine & Foundry Company, a corporation of New Jersey Application January 29, 1953, Serial No. 333,857

11 Claims. (Cl. 340—174)

This invention relates to magnetic memory circuits and apparatus, and has as an object to increase the speed of operation of such circuits and apparatus.

In all the known circuits in which static magnetic memory units have been employed, one of the greatest problems has been to distinguish the magnetic state of a magnetic core. Such a core is usually closed upon itself in the form of a ring for maximum efficiency, and has windings which usually function for energizing the core or for sensing the response of the core. When such a core is energized until the magnetizing force saturates it, the residual flux remaining upon removal of the saturating field has a flux density $B_r$. If the core is saturated in the opposite direction and the saturating field removed, the residual flux density is $-B_r$. The external magnetomotive force required to shift the core from one stable state to the other is obtained by passing a current pulse through one of its windings. As the core shifts, a voltage is induced in all of its windings. The core can have two states with respect to pulses of a given polarity in a given winding: an active state in which the preceding residual magnetization is opposite in direction to that induced by a pulse, and an inactive state in which the core flux and the induced flux direction are the same.

The output voltage is a function of the rate of change of flux so that there are two types of voltages read into or out of a core depending upon whether there is a net change of magnetic state after a current pulse has been applied. When a core is shifted from its inactive state with flux density $B_r$ to saturation with flux density $B_s$ in the same direction, a small voltage pulse called a "zero" pulse is induced across a sensing winding, the time interval of this pulse being proportional to the flux change between $B_r$ and $B_s$ which is, of course, relatively small. Nevertheless, such a "zero" pulse is often mistaken for the "one" pulse which results from the shifting of a core from its active state to saturation.

For minimizing the "zero" voltages, the previous practice has been to use highly oriented magnetic materials having rectangular hysteresis loops for the cores. Since with such materials the change from $B_r$ to $B_s$ is very small, the induced "zero" voltage is correspondingly small so that there is a definite distinction between a "zero" and a "one" voltage. Such materials and their use in magnetic binary shift registers is described in an article by An Wang and Way Dong Woo published on pages 49–54 of volume 21, the January, 1950 issue, of the Journal of Applied Physics.

The use of such highly oriented materials or rectangular hysteresis loop materials as they are often called, is limited to applications in which the speed of response may be relatively slow. To obtain high shifting speeds at reasonable current levels, it is necessary to use non-rectangular hysteresis loop materials such as ultra-thin "Permalloy" tape or magnetic ferrites. However, these materials have such saturation hysteresis loops that it is often difficult to distinguish between "zeros" and "ones."

My invention overcomes the basic difficulty of distinguishing between the "one" and "zero" voltages when using magnetic materials having non-rectangular hysteresis loops, by associating a bucking voltage source with each storage core. When "zero" signals are read into a storage core, the voltage read out of the core adds to an oppositely directed voltage so that the net result is substantially zero. When a "one" is read into this storage core, the voltage subsequently read out it much larger and lasts longer than the cancelling voltage so that the net "one" voltage is only slightly distorted by the addition of the cancelling pulse. Thus, this invention enables non-rectangular hysteresis loop cores to be used with equal or better differences between "zero" and "one" voltages while retaining the high shift speeds of cores having non-rectangular hysteresis loops.

This invention will now be described with reference to the drawings, of which:

Figure 1:
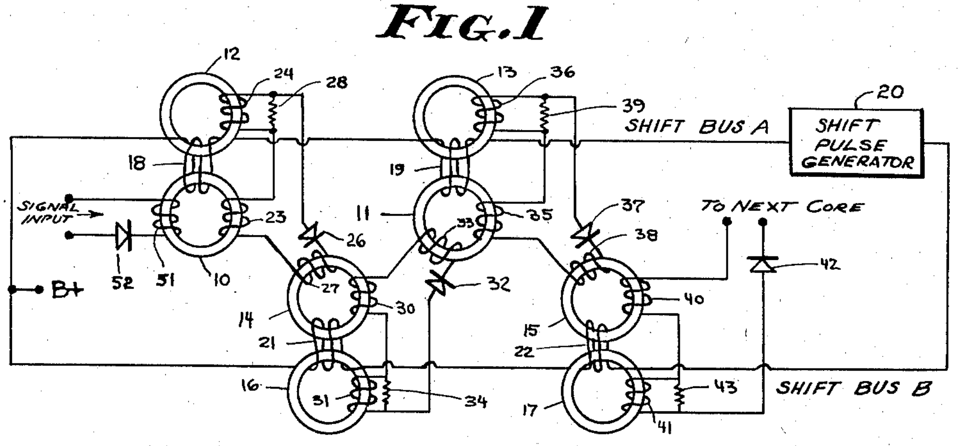
Fig. 1 is a circuit schematic of a magnetic shift register embodying this invention and using separate storage and bucking cores.

Referring first to Fig. 1, the storage cores 10 and 11 have the bucking cores 12 and 13 respectively, associated therewith, while the temporary storage cores 14 and 15 have the bucking cores 16 and 17 respectively, associated therewith.

The shift windings 18 and 19 of the storage cores 10 and 11 respectively, are common also to their associated bucking cores 12 and 13 respectively, and are connected in series with the shift pulse generator 20 and to the plus terminal (B+) of a direct current supply source for the plates of the vacuum tubes used in the generator.

The shift windings 21 and 22 of the temporary storage cores 14 and 15 respectively, are common also to their associated bucking cores 16 and 17 respectively, and are connected in series with the shift pulse generator 20 and B+. Generator 20 is a conventional shift generator having a pair of tubes which conduct alternately and have their plates connected in series with shift windings A and B, respectively, for supplying shift pulses thereto.

The first storage core 10 has the input winding 51 connected through the diode 52 to a signal source which is not illustrated. The core 10 has an output winding 23 connected in series with the output winding 24 on the bucking core 12, and through the diode 26 to the input winding 27 on the first temporary storage core 14. The output winding 24 may have a resistor 28 connected thereacross for preventing ringing.

The first temporary storage core 14 has an output winding 30 connected in series with the output winding 31 on the bucking core 16, and through the diode 32 to the input winding 33 on the second storage core 11. The resistor 34 may be connected across the winding 31 for preventing ringing.

The second storage core 11 has an output winding 35 connected in series with the output winding 36 on the bucking core 13, and through the diode 37 to the input winding 38 on the second temporary storage core 15. The resistor 39 may be shunted across the winding 36 for preventing ringing.

The second temporary storage core 15 has an output winding 40 connected in series with the output winding 41 on the bucking core 17, and through the diode 42 to the input winding of the next core in order. The resistor 43 may be connected across the winding 41 for preventing ringing.

As is well known, there may be as many storage cores and temporary storage cores as there are digits to be stored in the shift register. Each additional core in this embodiment of the invention, would have an associated bucking core.

It is usual in shift registers of this type for the shift pulse generator to pulse, first the storage line of cores, and next the temporary storage line of cores. If a "one" is stored in the first storage core, the application of a shift pulse to the line of storage cores will cause a voltage to be induced in the output winding of the first storage core and supplied into the input winding on the first temporary storage core, causing the "one" to be transferred to the latter core. The application of a shift pulse to the line of temporary storage cores will cause the "one" to be shifted to the second storage core, and so on. One cycle of operation thus consists of cycling first the storage line and then the temporary storage line. At the end of each cycle the "one" has advanced one stage.

For preventing a "zero" from spuriously appearing as a "one," the output windings 24, 31, 36 and 41 on the bucking cores 12, 16, 13 and 17 respectively, are arranged to provide voltages equal and opposite to the "zero" voltages appearing across the output windings of their associated storage cores, so that the "zero" voltages are balanced out. On the other hand when a "one" is read into a storage core, the voltage subsequently read out is much larger and lasts much longer than the cancelling voltage since no "one" is inserted into the bucking core. Thus, when a "one" is read through the input winding 51 on the core 10, no corresponding "one" is read into the associated bucking core 12. However, the same "zero" voltage would be induced in the winding 23 on the storage core 10 and in the winding 24 of the bucking core 12 when these cores are pulsed by the shift pulse generator when there are no "ones," and since the two "zero" voltages are opposite in polarity they will cancel out, and no substantial "zero" voltage will appear in the input winding 27 on the temporary storage core 14.

The winding 18 need not be common to the cores 10 and 12. Separate shift windings connected in series may be used. This applies also to windings 19, 21 and 22.

Figure 2:
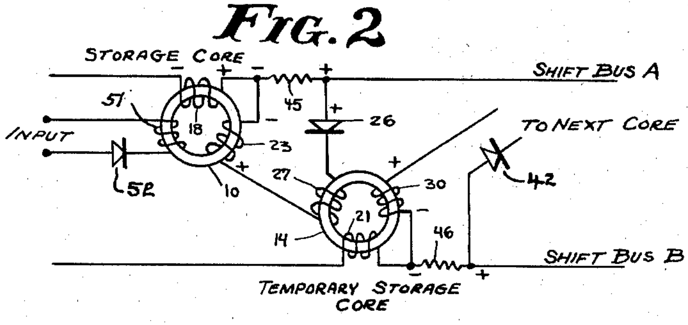
Fig. 2 is a circuit modification in which a bucking voltage is developed across an impedance.

In the circuit of Fig. 2, one end of the shift winding 18 of a storage core 10 is connected in auto-transformer fashion to one end of the output winding 23 of the core 10. An impedance 45 is connected at one end to the junction of the windings 18 and 23, and at its other end to the shift winding of the next storage core through the shift bus A, and is connected in series with the output winding 23 on the storage core 10 and the input winding 27 on the first temporary storage core 14. The voltage drop across the impedance 45 when a shift current pulse passes through it, has a polarity opposite to a "zero" voltage, and therefore, balances out or decreases substantially the "zero" voltage. The impedance 45 can be a resistor or an inductor.

The shift winding 21 and the output winding 30 of the first temporary storage core 14 also are connected together and to an impedance 46 which is connected in series with the shift bus B and in series with the output winding 30 of the core 14, and is arranged to balance out or reduce the "zero" voltages.

The other cores of a shift register could be connected to impedances similar to the impedances 45 and 46 for balancing out "zero" voltages.

Figure 3:
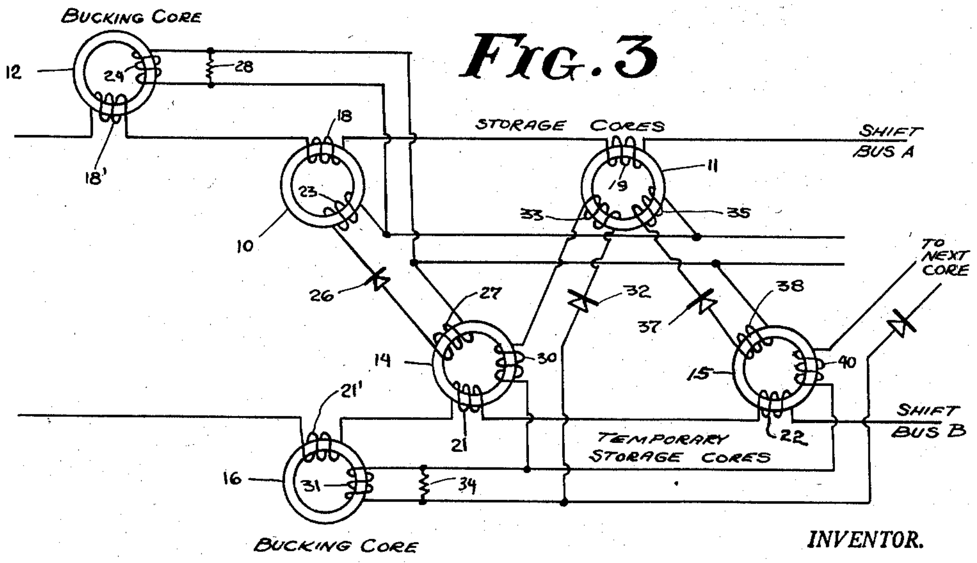
Fig. 3 is a circuit schematic of a shift register embodying this invention in which a common cancelling pulse is applied to a group of storage cores.

Fig. 3 illustrates a shift register similar to Fig. 1 except that a common bucking core is provided for all of the storage cores, and another common bucking core is provided for all of the temporary storage cores.

The bucking core 12 has a separate shift winding 18' connected in series with the shift windings 18 and 19 of the storage cores 10 and 11. The bucking winding 24 on the core 12 is connected in series not only with the output winding 23 of the core 10 and the input winding 27 on the core 14, but with the output winding 35 of the core 11 and the input winding 38 on the core 15, and supplies voltages equal and opposite to the "zero" voltages when the storage cores are pulsed. The bucking winding 24 would also be similarly connected to corresponding windings of all of the other storage cores used.

Likewise, the bucking winding 31 is connected in series with the output windings of the temporary storage cores and the input windings of the respective storage cores for balancing out the "zero" voltages resulting from the pulsing through the shift bus B of the temporary storage cores.

While embodiments of the invention have been described for the purpose of illustration, it should be understood that the invention is not limited to the exact circuits and circuit components illustrated, since modifications thereof may be suggested by those skilled in the art, without departure from the essence of the invention.

What is claimed is:

1. A magnetic memory circuit comprising a magnetic shift register having a line of magnetic cores having nonrectangular hysteresis loops, shift and output windings on said cores, a magnetic bucking core, shift and output windings on said bucking core, a shift pulse generator connected to said shift windings, and means including said generator and including means connecting said output winding on said bucking core in series with each of said first mentioned output windings for providing a voltage opposite in polarity to the voltages induced in said first mentioned output windings when said generator transmits a shift current pulse through said shift windings.

2. A magnetic memory circuit comprising a magnetic shift register having a line of magnetic cores having nonrectangular hysteresis loops, shift and output windings on said cores, a magnetic bucking core associated with each of said cores of said line, shift and output windings on said bucking core, a shift pulse generator connected to said shift windings, and means connecting said output windings on said bucking cores in series with the output windings on corresponding cores of said line for providing voltages opposite in polarity to the voltages induced in said first mentioned output windings when said generator transmits a shift current pulse through said shift windings, said opposite voltage being sufficient only to substantially cancel the voltage induced when a "zero" is shifted.

3. A magnetic memory circuit comprising a magnetic storage core, a magnetic temporary storage core, an output winding on said storage core, an input winding on said temporary storage core, a bucking magnetic core having a bucking winding thereon connected in series with said windings, and means associated with said bucking core and operative only when a "zero" or a "one" stored in said storage core is shifted to said temporary storage core, to generate in said bucking winding a voltage opposite in polarity to the voltage induced in said output winding, said voltage being sufficient only to substantially cancel the voltage induced when a "zero" is shifted.

4. A magnetic memory circuit comprising a magnetic storage core, a magnetic temporary storage core, an output winding on said temporary storage core, an input winding on said storage core, a bucking magnetic core having a bucking winding thereon connected in series with said windings, and means associated with said bucking core and operative only when a "zero" or a "one" stored in said temporary storage core is shifted to said storage core, to generate in said bucking winding a voltage opposite in polarity to the voltage induced in said output winding, said voltage being sufficient only to substantially cancel the voltage induced when a "zero" is shifted.

5. A magnetic circuit comprising a line of magnetic storage cores having output windings thereon, a line of magnetic temporary storage cores having corresponding input windings thereon, a bucking magnetic core associated with each storage core and having a bucking winding thereon connected in series with corresponding output and input windings, and means associated with each of said bucking cores and operative only when "zeros" or "ones" stored in said storage cores are shifted to said temporary storage cores, to generate in said bucking windings a voltage opposite in polarity to the voltage induced in said output windings, said voltage being sufficient only to substantially cancel the voltage induced when a "zero" is shifted.

6. A magnetic memory circuit comprising a line of magnetic storage cores having input windings thereon, a line of magnetic temporary storage cores having corresponding output windings thereon, a bucking magnetic core associated with each temporary storage core and having a bucking winding thereon connected in series with corresponding output and input windings, and means associated with each of said bucking cores and operative only when "zeros" or "ones" stored in said temporary storage cores are shifted to said storage cores, to generate in said bucking windings a voltage opposite in porality to the voltage induced in said output windings, said voltage being sufficient only to substantially cancel the voltage induced when a "zero" is shifted.

7. A magnetic memory circuit comprising a magnetic shift register having a line of magnetic cores having non-rectangular hysteresis loops, output windings on said cores, means for shifting said cores from one state of saturation to the opposite state of saturation, a bucking magnetic core associated with each core of said line and having a bucking winding thereon connected in series with said output windings, and means associated with each of said bucking cores connected in series with said shifting means and operative only when said cores are shifted to generate in said bucking windings a voltage opposite in polarity to the voltage induced in said output windings, said voltage being sufficient only to substantially cancel the voltage induced when a "zero" is shifted.

8. A magnetic memory circuit as claimed in claim 7, in which the means for shifting the cores includes shift windings on the cores and a shift pulse generator connected to the shift windings.

9. A magnetic memory circuit as claimed in claim 7, in which the means for generating said voltage in said bucking winding includes shift windings on said bucking cores connected in series with said shifting means.

10. A magnetic memory circuit comprising a line of magnetic storage cores having output windings thereon, a line of magnetic temporary storage cores having corresponding input windings thereon, a common magnetic bucking core associated with said storage cores and having a bucking winding thereon connected in series with corresponding output and input windings, and means associated with said common bucking core and operative only when "zeros" or "ones" stored in said storage cores are shifted to said temporary storage cores to generate in said bucking winding a voltage opposite in polarity to the voltage induced in said output windings, said voltage being sufficient only to substantially cancel the voltage induced when a "zero" is shifted.

11. A magnetic memory circuit comprising a magnetic shift register having a line of magnetic cores having non-rectangular hysteresis loops, output windings on said cores, means for shifting said cores from one state of saturation to the opposite state of saturation, a common magnetic bucking core associated with said cores of said line and having a bucking winding thereon connected in series with said output windings, said magnetic bucking core having a shift winding connected in series with said shifting means and operative only when said cores are shifted to generate in said bucking winding a voltage opposite in polarity to the voltage induced in said output windings.

References Cited in the file of this patent

UNITED STATES PATENTS

| | | |
|---|---|---|
| 2,591,406 | Carter et al. | Apr. 1, 1952 |
| 2,654,080 | Browne | Sept. 29, 1953 |
| 2,708,722 | An Wang | May 17, 1955 |

OTHER REFERENCES

Journal of Applied Physics, January 1950, pp. 49–54.

Publication: Paper No. 150, presented at IRE National Convention, March 5, 1952, pp. 5–8, Figs. 5–8.